Oct. 6, 1964  C. L. EMMERICH  3,152,207
LINE OF SIGHT STABILIZING SYSTEM UTILIZING
OPTICAL WEDGE PRISMS
Filed Nov. 3, 1960  3 Sheets-Sheet 1
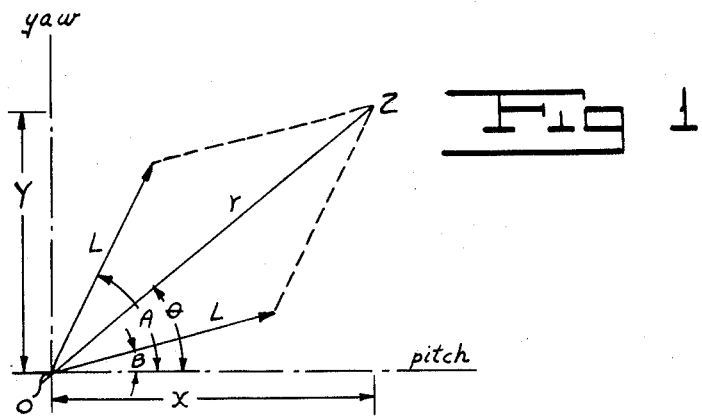
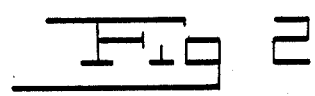
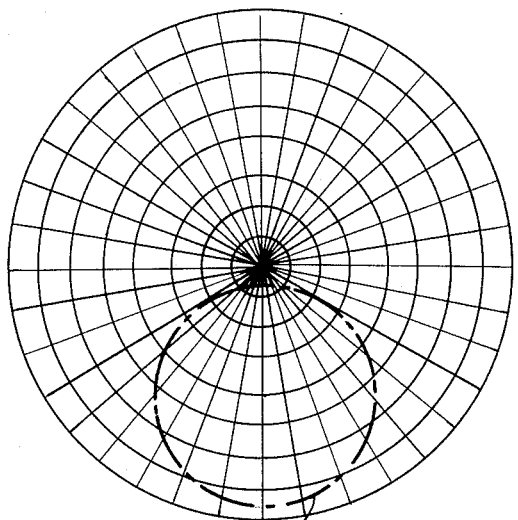
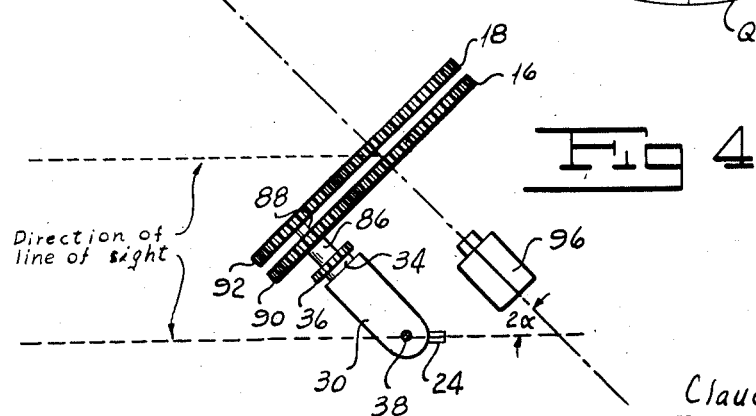
INVENTOR.
Claude L. Emmerich
BY
ATTORNEY Oct. 6, 1964 C. L. EMMERICH 3,152,207
LINE OF SIGHT STABILIZING SYSTEM UTILIZING
OPTICAL WEDGE PRISMS
Filed Nov. 3, 1960 3 Sheets-Sheet 2
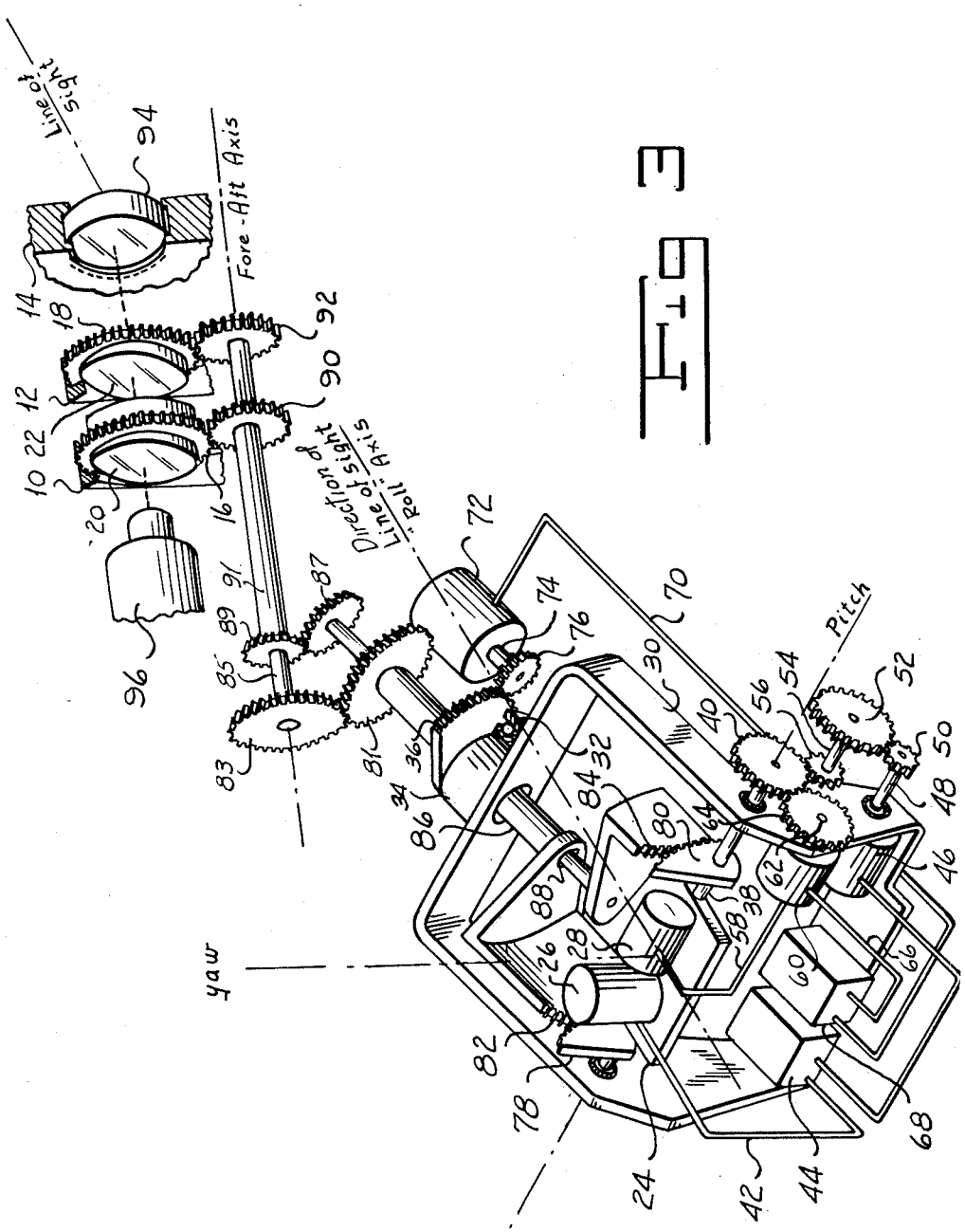
INVENTOR.
Claude L. Emmerich
BY Henry L. Steiner
ATTORNEY

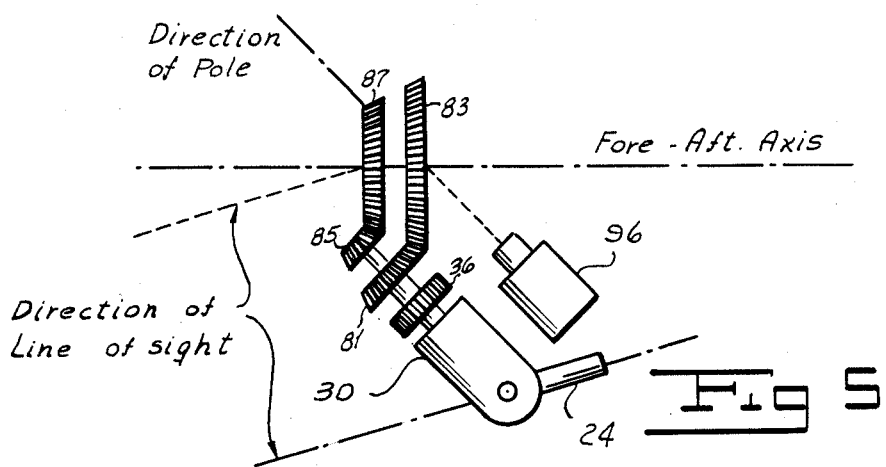
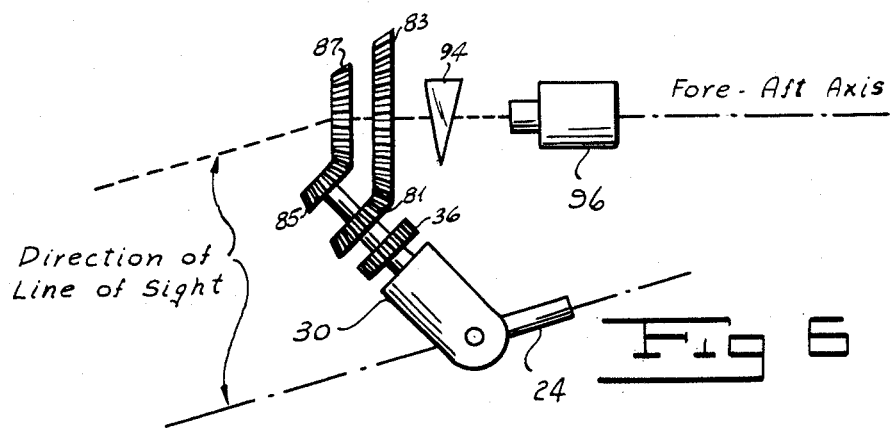
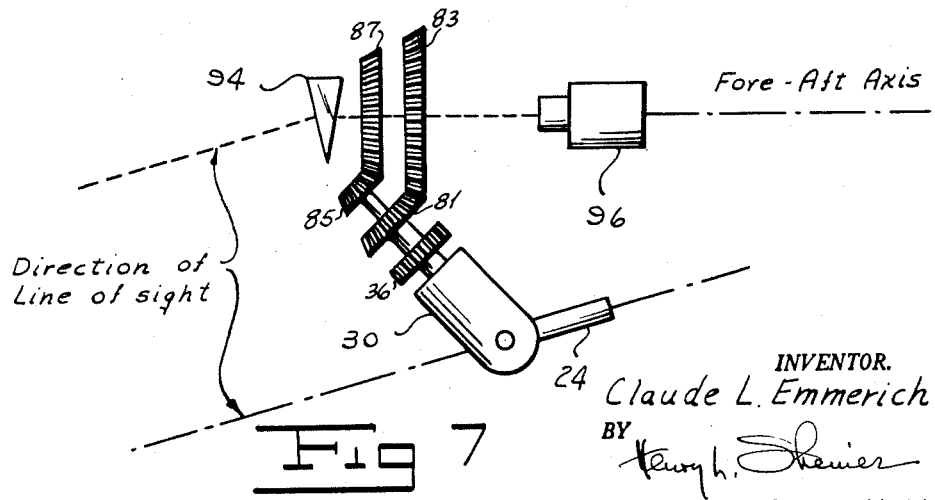

United States Patent Office 3,152,207
Patented Oct. 6, 1964

3,152,207
LINE OF SIGHT STABILIZING SYSTEM UTILIZING OPTICAL WEDGE PRISMS
Claude L. Emmerich, Scarsdale, N.Y., assignor to United Aircraft Corporation, East Hartford, Conn., a corporation of Delaware
Filed Nov. 3, 1960, Ser. No. 67,086
6 Claims. (Cl. 88—1)

My invention relates to a wedge deflection system and more particularly to an improved wedge deflection system for use in a line-of-sight stabilizing system which is simpler, more compact, and lighter than line-of-sight stabilizing systems of the prior art employing wedges.

It is known in the prior art that a pair of counter-rotating optical wedges produce a line-of-sight or beam deflection, the direction of which deflection is determined by the orientation of the pair of prisms with respect to a reference point and the magnitude of which is determined by the relative disposition of the two wedges of the pair.

It has been suggested in the prior art that a stabilized line-of-sight can be provided with reference to the yaw and pitch axes, for example, of a craft by orienting respective sets of optical wedges or prisms to produce deflections in the direction of the pitch axis and in the direction of the yaw axis. When the prisms of the sets are counter-rotated in response to pitch and yaw signals generated by a stable platform which is oriented to a direction parallel to the line-of-sight, these prisms maintain the line-of-sight stabilized in space. For the correct rotation to be applied to one set of the deflection wedges such, for example, as the pitch wedges, it is necessary to employ a differential, one input of which is provided by the pitch gimbal carried by the yaw gimbal of the stable platform system and the other input of which is provided by the yaw gimbal.

It will be appreciated that space and weight considerations are of prime importance in missiles and the like. I have invented a wedge deflection system for use in a line-of-sight stabilizing system which embodies an improvement over systems of the prior art such as that described hereinabove. My improved wedge deflection system is simpler than systems of the prior art since it requires fewer parts. My system does not require the differential described above. My system employs only one set of counter-rotating prisms. Since my system employs fewer parts than systems of the prior art, it is more compact and lighter in weight than are systems of the prior art.

One object of my invention is to provide a wedge deflection system which is simpler than systems of the prior art in that it employs fewer parts.

Another object of my invention is to provide a wedge deflection system which is more compact than systems of the prior art.

A further object of my invention is to provide a wedge deflection system which is lighter than systems of the prior art.

Still another object of my invention is to provide a wedge deflection system which is especially adapted for use in a line-of-sight stabilizing system which is simpler, more compact, and lighter than systems of the prior art.

Other and further objects of my invention will appear from the following description.

The purpose of the wedge-deflection system described herein is to provide a means of stabilizing the line-of-sight of an optical viewing device such as a star tracker or a camera independent of the variations in attitude of the vehicle to which the viewing device is rigidly attached. The stabilized reference direction is furnished by a pair of gyroscopes known in the art as single-degree-of-freedom gyros. These gyros control the orientation of a so-called gimbaled platform. It is also possible to operate the wedge-deflection system in conjunction with a gimbaled platform controlled by a two-degree-of-freedom gyro.

The object of using wedges to stabilize the line-of-sight is to make it possible to mount the viewing device rigidly on the vehicle, resulting in an efficient, small, and light-weight package. Thus the optical axis of the viewing device partakes of the attitude variation of the vehicle, while the line-of-sight remains fixed relative to the stable platform controlled by the gyros. The wedges are controlled by the relative motion of the vehicle with respect to the stable platform in such a manner that the line-of-sight is always deflected into coincidence with the optical axis of the viewing device.

In general my invention contemplates the provision of a wedge deflection system comprising a pair of counter-rotating optical wedges and a stable platform, the outer gimbal axis of which is oriented to an angle with respect to the line-of-sight to which the stable platform is oriented. In response to signals generated by the yaw and pitch gimbals of the stable platform, I drive the wedges through function gears to provide a line-of-sight which is stabilized with respect to the platform. If desired, I may provide my system with a fixed wedge which permits me to make the best use of the optical wedges.

In the accompanying drawings which form part of the instant specification and which are to be read in conjunction therewith and in which like reference numerals are used to indicate like parts in the various views:

FIGURE 1 is a vector diagram illustrating certain characteristics of my wedge deflection system.

FIGURE 2 is a diagram illustrating the field of view provided by my wedge deflection system.

FIGURE 3 is a perspective view with parts broken away and with other parts shown in section of my wedge deflection system used in a line-of-sight stabilizing system.

FIGURE 4 is a schematic view of my wedge deflection system illustrating certain features of my invention.

FIGURE 5 is a schematic view of a form of my wedge deflection system in which the wedges are oriented to the direction of a fore-and-aft axis.

FIGURE 6 is a schematic view of a form of my wedge deflection system in which both the wedges and the camera are oriented to the fore-and-aft axis.

FIGURE 7 is a schematic view of a form of my wedge deflection system in which best use of the optical wedges is achieved.

The following nomenclature is used in describing the coordinate axes of the system:

"Roll" represents motion about the line-of-sight as an axis, and is therefore only identical with the conventional roll motion of a craft when the fore-aft axis of the craft is aligned parallel to the line of sight.

"Pitch" and "Yaw" represent motions about axes which are at right angles to the line-of-sight and at right angles to each other. The orientation of the pitch axis is parallel to the inner gimbal axis of the stable platform, and is normally in the horizontal plane.

As is known in the art, the deflection produced by an individual wedge as it rotates can be represented by a vector of constant length rotating about an origin. If two counter-rotating wedges are oriented to provide a line-of-sight along a particular axis when no deflection is introduced by the set of wedges, then any desired deflection within the limits of that provided by the wedges can be had by counter-rotating the wedges of the pair. If two sets of such wedges are employed, one to provide deflection along the yaw axis of a craft and the other set to provide deflection along the pitch axis, then the line-of-sight of the system can be deviated to any point in the plane of the yaw and pitch axes. Referring now to FIG- URE 1, in such a system where it is desired to deflect the line-of-sight to a point Z with reference to an origin O then one set of prisms would provide a deflection Y in the direction of the yaw axis while the other set provided a deflection X in the direction of the pitch axis to produce a resultant deflection $r$ making an angle $\theta$ with the pitch axis.

It will be remembered that as is pointed out hereinabove, the deflection produced by an individual wedge as it rotates can be represented by a vector of constant length rotating about an origin such as O. With this in mind it will be apparent that the deflection $r$ in the direction $\theta$ can be resolved into a pair of vectors each having a length L and having respective directions A and B from the reference direction. The deflections represented by these vectors can be produced by respective wedges of a pair. By rotating the wedges of the pair in opposite directions through the same angular displacement, the magnitude $r$ of the resultant can be changed without changing the direction of the resultant. By rotating both wedges of the pair in the same direction the angle $\theta$ of the resultant can be changed. In this manner any desired deviation of a line-of-sight from the origin can be produced. While the operation outlined above generally is true, a special condition exists when the resultant is very small, such that the point Z in FIGURE 1 approaches the origin O. Any small change in the location of the point Z in the vicinity of the origin O may be associated with large variations in the angle $\theta$, requiring the wedge pair to be rotated through an inordinately large angle to follow a small change in the required deflection of the line-of-sight. I avoid this problem and give significance to the $\theta$ coordinate commensurate with the magnitude of the required deflections by orienting the wedges of the pair with reference to a pole which is displaced from the field of view as will be apparent from the description hereinafter.

Referring now to FIGURE 3 I have shown one form of my wedge deflection system in use in a line-of-sight stabilizing system. This form of my invention comprises respective bearing supports 10 and 12 carried by the frame 14 of a missile or the like with which my system is used. The supports 10 and 12 carry for rotary movement respective wedge frames 16 and 18, the peripheries of which are formed with spur gear teeth. Frames 16 and 18 carry respective optical wedges 20 and 22 which when oriented respectively with their thick portions up and down produce no deviation of a beam from the optical axis of the wedge system.

The line-of-sight stabilizing system comprises a stable platform 24 which may be oriented to the roll axis of the craft which may be the direction of the line-of-sight. The platform 24 supports a pitch gyroscope 26 of a type known in the art which upon a displacement of the craft frame 14 about the pitch axis produces a signal which is a measure of pitch. Platform 24 also carries a yaw gyroscope 28 of a suitable type known to the art which upon movement of the missile frame 14 in yaw produces a signal proportional to yaw.

I support the outer gimbal 30 of the stabilized platform system in a bearing 32 carried by the frame 14. I form the outer gimbal 30 with a hub 34 carrying a spur gear segment 36 which permits the gimbal 30 to be moved around the axis to which the outer gimbal 30 is oriented. Gimbal 30 supports a shaft 38 carrying a spur gear 40 which is adapted to be driven to rotate the platform about an axis perpendicular to the outer gimbal axis.

When in response to a pitch of the frame 14 the gyroscope 26 produces an error signal, a channel 42 applies this signal to an amplifier 44 which supplies a radial drive motor 46 carried by the gimbal 30. Motor 46 drives a shaft 48 carrying a pinion 50 which drives a spur gear 52 carried by a shaft 54 rotatably supported on the gimbal 30. Shaft 54 carries a pinion 56 in engagement with gear 40.

In response to a yaw of the frame 14 the yaw gyroscope 28 produces an output signal which I apply through a channel 58 to one input terminal of a resolver 60 having a rotor shaft 62 which is driven by the gear 40 through the medium of a gear 64 carried by shaft 62. I insert the resolver 60 in this system to maintain uniform gain in the gyroscope servo loop. A channel 66 applies the output signal of the resolver 60 to an amplifier 68. An output channel 70 applies the output from amplifier 68 to a traverse drive motor 72 having an output shaft 74 carrying a pinion 76 in engagement with the spur gear segment 36.

The geared drive employing pinions 50, 52, 56, 64, and 40 may be replaced by a direct coupling of the motor 46 to the platform pitch axis 38. The resolver 62 can also be mounted on the platform axis by direct coupling.

From the system just described it will be apparent that in response to pitch and yaw of the frame 14 the gyroscopes 26 and 28 produce respective signals which, through the system just described, drive the gimbal 30 and the platform 24 to stabilize the platform. Since the platform is oriented to the line-of-sight, the gyroscopes are insensitive to rotations about the line-of-sight which normally are rolling motions of the frame 14 and correction in this coordinate need not be provided.

Referring again to FIGURE 1, with pitch and yaw correction signals available we will determine what rotations must be applied to the wedges to stabilize the line-of-sight provided by the wedges in terms of $r$, $\theta$ coordinates. As can be seen by reference to FIGURE 1, the respective wedges 20 and 22 can be considered to provide respective deviations having a magnitude L at respective angles A and B to produce a resultant deviation $r$ at an angle $\theta$. From the figure it will readily be apparent that:

(1) $$\theta = \frac{A+B}{2}$$

It can also readily be determined from the diagram that:

(2) $$r = 2L \cos \frac{(A-B)}{2}$$

Solving Equations 1 and 2 for the terms A and B we obtain:

(3) $$A = \theta + \cos^{-1}(r/2L)$$

and (4) $$B = \theta - \cos^{-1}(r/2L)$$

Equations 3 and 4 indicate those angles through which the wedges 20 and 22 must be driven to correct the optical system in terms of $r$ and $\theta$ for errors which otherwise would be introduced owing to yaw and pitch.

Referring again to FIGURE 3, the platform shaft 38 carries respective function gears 78 and 80 which engage respective function gear segments 82 and 84 respectively supported for movement therewith on a quill 86 and on a shaft 88 which is disposed concentrically of the quill 86 in any suitable manner known to the art. The function gears 78 and 80 are so constructed that the rotation of both shaft 88 and quill 86 are arc cosine functions of the rotation of shaft 38.

Quill 86 carries for rotation therewith a bevel gear 81 which drives a bevel gear 83 carried by a shaft 85 the axis of which extends in the direction of the fore-and-aft axis of the craft. Shaft 85 carries a pinion 92 which engages the teeth on frame 18 carrying wedge 22. Shaft 88 carries for rotation therewith a bevel gear 87 which drives a bevel gear 89 carried by a quill 91 surrounding shaft 85. A gear 90 on quill 91 engages the teeth of frame 16 to drive wedge 20.

From the structure just described it will be apparent that when the traverse drive motor 72 is energized to drive the gimbal 30 around the axis to which the gimbal is oriented then both wedges 20 and 22 are driven in the same direction. When the motor 46 is energized to drive the shaft 38, then the wedges 20 and 22 are driven in opposite directions through an angle whose cosine is $$\frac{r}{2L}$$

Thus by reasons of the mechanical arrangement I employ, the wedges 20 and 22 are driven in accordance with Equations 3 and 4 above.

As is explained hereinabove, the pair of wedges can be driven to produce any desired deviation of a line-of-sight with reference to the optical axis of the system. As is also explained hereinabove, the vector sum representing the deviation of the line-of-sight from the optical axis of the wedge pair must not be allowed to decrease below a certain minimum amount. I drive the wedges 20 and 22 with respect to a pole which is displaced by a sufficiently large angle to fall completely outside of the field of view. This gives proper significance to the $\theta$ coordinate under all conditions of operation. I accomplish this result most efficiently by inserting a fixed wedge in the optical path as indicated at 94 in FIGURE 3. This wedge displaces the pole of the rotating wedge pair so that the field of view is in effect defined by the smaller circle Q at the bottom of FIGURE 2.

For the simplest mechanical configuration of my system, I mount the wedges 20 and 22 with their optical axes extending in the direction of the pole to the direction of which the outer gimbal axis is oriented. With this arrangement I am able to employ spur gears to provide the driving connections between the quill 86 and shaft 88 and the two wedges. As can be seen in FIGURE 4, radiation coming from the direction of the line-of-sight normally parallel to the fore-aft axis of the craft would enter the wedge system at an angle to the optical axis of the wedge system and would be deflected towards the camera or viewing device 96 whose optical axis is oriented at an angle $2\alpha$ to the fore-aft axis of the craft. It will readily be appreciated that such an arrangement does not make best use of the wedges because it requires the entire wedge and viewing device assembly to be oriented at a relatively large angle to the fore-aft axis of the craft.

In the construction of the improved wedge deflection system I take advantage of the fact that a wedge produces the same deflection of the line-of-sight practically independent of the orientation of the plane formed by the periphery of the wedge. Thus the required deflection of the line-of-sight indicated in FIGURE 4 can more practically be accomplished by positioning the wedges with their axes of rotation parallel to the fore-aft axis of the craft as indicated in FIGURE 5.

Furthermore, in order to improve the wedge deflection system, it is desirable to mount the viewing device such that its axis is also parallel to the fore-aft axis of the craft. I accomplish this by introducing a fixed wedge 94 in the optical path which acts to deflect the line-of-sight from the pole into the direction of the fore-aft axis of the vehicle. This is made possible by the fact that the direction of the pole, which is also the direction of the outer gimbal axis of the platform is fixed with respect to the craft. This is shown in FIGURE 6.

Finally, in order to still further improve the wedge deflection system, I interchange the relative positions of the fixed and rotating wedges in the optical path so that the fixed wedge 94 acts also as a seal and window in the nose of the craft, as shown in FIGURE 7. Of course, any desired orientation of the camera 96 can be achieved by introducing the required fixed deviation into the system by suitable means known to the art.

In operation of my wedge deflecting system, I orient the stable platform 24 to the desired line-of-sight by supplying the proper precession signals to the gyros 26 and 28. When this has been done, in response to craft pitch, the pitch gyroscope 26 generates a signal which is amplified to energize motor 46 to cause the motor to drive the shaft 38 to stabilize platform 24 to the direction of the line-of-sight. At the same time the function gears 78 and 80 drive the sectors 82 and 84 to rotate the wedges 20 and 22 in opposite directions to stabilize the line-of-sight in accordance with the $r$ terms of Equations 3 and 4. When the craft yaws, the yaw gyroscope 28 produces an output signal which is fed to the resolver 60, the output signal of which is amplified to energize motor 72. When energized, motor 72 drives the outer gimbal 30 and the parts carried thereby. This action results in stabilizing platform 24 to the line-of-sight and at the same time drives both wedges 20 and 22 in the same direction to account for the $\theta$ term in Equations 3 and 4. In order to improve the operation of the system and to make the best use of the wedges, I may employ the fixed wedge 94 to act as a seal and window. This fixed wedge will enable the viewing device 96 to be positioned at any desired orientation.

A simple line-of-sight deflection system can be constructed by using a single pair of rotatable wedges. One of the characteristics of a single pair of wedges is the fact that the deflection of the line-of-sight is related to the rotations of the wedges in the form of $r$ and $\theta$ coordinates. In order to simplify the correlation between the gimbal angles of a stable platform providing the necessary reference information for stabilizing the line-of-sight and the $r$, $\theta$ coordinates required for the wedges, the platform gimbals are also disposed in $r$ and $\theta$ coordinates. The complication arising from the pole in this system corresponding to the coordinate $r=0$ is avoided by employing a fixed offset.

It will be seen that I have accomplished the objects of my invention. I have provided a wedge deflection system for use in a line-of-sight stabilizing system which is simpler than systems of the prior art. My wedge deflection system eliminates the necessity for employing a differential such as is required in systems of the prior art in which independent deflections along two coordinate axes are used. My system requires the provision of only a single set of wedges. My system is smaller, more compact, and lighter than are systems of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A wedge deflecting system for a line of sight including in combination a support, a pair of optical wedges, means mounting said wedges on said support for rotary movement about an axis, said wedges being adapted to be driven to produce an optical deviation with reference to a pole on polar coordinates comprising a radius and an angular displacement of said radius, means adapted to be actuated concomitantly to drive said wedges in the same direction to vary one of two polar coordinates of the line of sight, means adapted to be actuated concurrently to drive said wedges in opposite directions to vary the other of said polar coordinates, means carried by said support and responsive to movement thereof for actuating said wedge driving means normally to direct the line of sight to a direction making an angle with the direction of said pole and means for ensuring that said radius coordinate at all times has a positive value appreciably greater than zero.

2. A wedge deflecting system for a line of sight including in combination a support, a pair of optical wedges, means mounting said wedges on said support for rotary movement about a common axis, respective drive means associated with said wedges for moving said wedges to produce an optical deviation with reference to a pole, means adapted to be energized to actuate said drive means to move said wedges in the same direction, means adapted to be energized to actuate said drive means to drive said wedges in opposite directions and means carried by said support and responsive to movement thereof for energizing said drive means to cause said wedges normally to provide a line of sight making an angle with the direction of said pole.

3. A wedge deflecting system for a line of sight including in combination a support, a pair of optical wedges, means mounting said wedges on said support for rotary movement about a common axis, respective drive means associated with said wedges for moving said wedges to produce an optical deviation with reference to a pole, means adapted to be energized to actuate said drive means to move said wedges in the same direction, means adapted to be energized to actuate said drive means to drive said wedges in opposite directions, means carried by said support and responsive to movement thereof for energizing said drive means to cause said wedges normally to provide a line of sight making an angle with the direction of said pole, a stationary optical wedge and means for mounting said stationary wedge in a position to reduce the angle between said direction of said line of sight and said axis of rotation of said pair of wedges.

4. A line of sight stabilizing system including in combination a body, an optical system providing a line of sight and comprising deflecting means adapted to be driven to deflect said line of sight along coordinates comprising a radius and an angular position of said radius from a nominal line of sight established when said system introduces no resultant deflection, means mounting said optical system on said body with said nominal line of sight lying in a reference plane fixed relative to the body to provide a reference line in said reference plane, stabilized means comprising an element having a spin axis, means mounting said stabilized means on said body with said spin axis making an angle with said reference plane, means carried by said body and responsive to movement thereof for producing a first signal in response to the angular displacement between said spin axis and said reference line, means responsive to said first signal for driving said deflecting means to vary said radius coordinate, means carried by said body and responsive to movement thereof for producing a second signal in response to the angular displacement between said reference plane and a plane containing the reference line and the spin axis and means responsive to said second signal for driving said deflecting means to vary said angular position of said radius to provide an actual line of sight parallel to the spin axis.

5. A line of sight stabilizing system including in combination a body, an optical system comprising a pair of rotatable prisms providing a line of sight and comprising means for driving said prisms to deflect said line of sight along coordinates comprising a radius and an angular position of said radius from a nominal line of sight when said system introduces no resultant deflection, means mounting said optical system on said body with said nominal line of sight lying in a plane fixed relative to the body to provide a reference line in the reference plane, stabilized means comprising an element having a spin axis, means mounting said stabilized means on said body with said spin axis making an angle with said reference plane, means carried by said body and responsive to movement thereof for producing a first signal in response to the angular displacement between said spin axis and said reference line, means responsive to said first signal for driving said prisms in opposite directions to vary said radius coordinate, means carried by said body and responsive to movement thereof for producing a second signal in response to the angular displacement between said reference plane and a plane containing the reference line and the spin axis and means responsive to said second signal for driving said prisms in the same direction to vary said angular position of said radius to provide an actual line of sight parallel to the spin axis.

6. A line of sight stabilizing system including in combination a body, an optical system providing a line of sight and comprising deflecting means adapted to be driven to deflect said line of sight along coordinates comprising a radius and an angular position of said radius from a nominal line of sight established when said system introduces no resultant deflection, means mounting said system on said body with said nominal line of sight lying in a reference plane fixed relative to the body to provide a reference line in said reference plane, an outer gimbal having an axis of rotation, means for orienting said outer gimbal axis to the direction of said nominal line of sight, stabilized means comprising an element having a spin axis, means including said outer gimbal for mounting said stabilized means on said body with said spin axis making an angle with said reference plane, means for producing a first signal in response to the angular displacement between said spin axis and said reference line, means responsive to said first signal for driving said deflecting means to vary said radius coordinate, means for producing a second signal in response to the angular displacement between said reference plane and a plane containing the reference line and the spin axis and means responsive to said second signal for driving said deflecting means to vary said angular position of said radius to provide an actual line of sight parallel to the spin axis.

References Cited in the file of this patent

UNITED STATES PATENTS

| | | |
|---|---|---|
| 1,093,639 | MacDougal | Apr. 21, 1914 |
| 1,638,190 | Eppenstein | Aug. 9, 1927 |
| 1,647,631 | Ives | Nov. 1, 1927 |
| 2,513,738 | Noxon | July 4, 1950 |
| 2,966,063 | Schaefer et al. | Dec. 27, 1960 |
| 2,975,668 | Eckel | Mar. 21, 1961 |
| 2,986,966 | McCartney et al. | June 6, 1961 |
| 3,035,477 | Bosch et al. | May 22, 1962 |

FOREIGN PATENTS

| | | |
|---|---|---|
| 1,165,448 | France | June 2, 1958 |